United States Patent
Lim (10) Patent No.: US 9,478,175 B2
(45) Date of Patent: Oct. 25, 2016

(54) BACKLIGHT UNIT AND LIQUID CRYSTAL DISPLAY USING THE SAME

(71) Applicant: LG Display Co., Ltd., Seoul (KR)

(72) Inventor: Seongho Lim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 64 days.

(21) Appl. No.: 14/478,165

(22) Filed: Sep. 5, 2014

(65) Prior Publication Data

US 2015/0116379 A1 Apr. 30, 2015

(30) Foreign Application Priority Data

Oct. 31, 2013 (KR) .................. 10-2013-0131789

(51) Int. Cl.
*G09G 3/34* (2006.01)
*H05B 33/08* (2006.01)
*H01L 27/146* (2006.01)
(Continued)

(52) U.S. Cl.
CPC ......... *G09G 3/342* (2013.01); *G02F 1/133603* (2013.01); *G09G 3/3406* (2013.01); *G09G 3/36* (2013.01); *G09G 3/3648* (2013.01); *H05B 33/0815* (2013.01); *G02F 2001/133612* (2013.01); *G09G 2320/0233* (2013.01); *G09G 2320/064* (2013.01); *G09G 2320/0633* (2013.01); *G09G 2330/021* (2013.01); *H05B 33/0827* (2013.01); *Y02B 20/346* (2013.01)

(58) Field of Classification Search
CPC .............. G09G 2320/0633; G09G 2320/064; G09G 3/342; G09G 3/3406
See application file for complete search history.

(56) References Cited

U.S. PATENT DOCUMENTS

2006/0209001 A1 9/2006 Kwon
2008/0079371 A1* 4/2008 Kang ................ H05B 33/0818
　　　　　　　　　　　　　　　　　　　　　315/309
2008/0265793 A1* 10/2008 Gurr ................ H05B 33/0812
　　　　　　　　　　　　　　　　　　　　　315/225

(Continued)

FOREIGN PATENT DOCUMENTS

CN 101409058 A 4/2009
CN 102097070 A 6/2011

(Continued)

OTHER PUBLICATIONS

Communication from the European Patent Office dated Mar. 25, 2015, in counterpart European patent application No. 14182362.5.

(Continued)

*Primary Examiner* — Lin Li
(74) *Attorney, Agent, or Firm* — Morgan, Lewis & Bockius LLP (57) ABSTRACT

A liquid crystal display (LCD) device having an LCD panel with a plurality of pixels is disclosed. The LCD device includes gate and data driving circuits to provide a gate pulse and a data voltage to the pixels, respectively, and a timing controller to control the gate and data driving circuits. The LCD device also includes a backlight unit to provide light to the liquid crystal panel. The backlight unit includes a light source having at least one LED channel, a driving voltage generator to supply a driving voltage to the LED channel, and an LED driver to supply a conditional pulse width and amplitude modulation (CPWAM) signal to the LED channel. The CPWAM signal has a pulse with an amplitude and a width that are both variable from one period of a predetermined length to another period of the predetermined length.

20 Claims, 10 Drawing Sheets

(51) Int. Cl.
*G02F 1/1335* (2006.01)
*G09G 3/36* (2006.01)

(56) References Cited

U.S. PATENT DOCUMENTS

| | | | |
|---|---|---|---|
| 2009/0021178 A1* | 1/2009 | Furukawa | G09G 3/3413 315/250 |
| 2009/0116232 A1* | 5/2009 | Chang | H05B 33/0818 362/231 |
| 2011/0080117 A1* | 4/2011 | Peker | G09G 3/3406 315/297 |
| 2011/0141003 A1 | 6/2011 | Kim et al. | |
| 2012/0013652 A1 | 1/2012 | Onishi et al. | |
| 2012/0019160 A1* | 1/2012 | Lee | H05B 33/0851 315/291 |
| 2012/0062605 A1* | 3/2012 | Aioanei | G09G 3/3406 345/690 |
| 2012/0086684 A1 | 4/2012 | Ichioka et al. | |
| 2012/0299979 A1 | 11/2012 | Murai et al. | |
| 2013/0162602 A1* | 6/2013 | Nakagawa | H01L 27/14601 345/175 |
| 2014/0139499 A1* | 5/2014 | Hussain | H05B 33/0827 345/204 |
| 2015/0181660 A1* | 6/2015 | Yagi | H05B 33/0815 348/725 |
| 2015/0206484 A1* | 7/2015 | Gotoh | G09G 3/3406 345/690 |

FOREIGN PATENT DOCUMENTS

| | | | | |
|---|---|---|---|---|
| DE | 102004023186 | * | 12/2005 | ........... G02F 1/1336 |
| EP | 2450740 A1 | | 5/2012 | |
| EP | 2515291 A1 | | 10/2012 | |
| KR | 100623713 B1 | | 9/2006 | |

OTHER PUBLICATIONS

"Pulse-Amplitude-Modulation drive control of LEDs," IP.Com Journal, IP.Com Inc., Jul. 2, 2002.

Chinese Office Action dated Aug. 16, 2016 for corresponding Chinese patent application No. 201410602433.4.

* cited by examiner

FIG. 1

(RELATED ART)

FIG. 2

(RELATED ART)

(RELATED ART)

BACKLIGHT UNIT AND LIQUID CRYSTAL DISPLAY USING THE SAME

This application claims the benefit of Korea Patent Application No. 10-2013-0131789 filed in Korea on Oct. 31, 2013, which is incorporated herein by reference for all purposes as if fully set forth herein.

BACKGROUND OF THE INVENTION

1. Field of the Invention

The present invention relates to a backlight unit and a liquid crystal display using the same, and more particularly, to a backlight unit and a liquid crystal display device using the same that can reduce one or more of power consumption, electromagnetic interference, heat generation, noise, and wavy noise.

2. Discussion of the Related Art

The use of flat panel displays has recently been growing exponentially. Among the flat panel displays, a liquid crystal display has been widely used in large-sized digital televisions requiring a thin profile, as well as in small-sized mobile devices requiring low power consumption.

Because liquid crystal cells formed on a liquid crystal display panel of the liquid crystal display do not emit light by themselves, the liquid crystal display requires a backlight unit. The backlight unit is typically positioned at a back surface of the liquid crystal display panel and irradiates light onto the liquid crystal display panel. The backlight unit greatly affects the performance of the liquid crystal display. For example, the backlight unit may greatly affect, among other things, the weight, design, lifespan, and power consumption of the liquid crystal display, as well as such image quality characteristics of the liquid crystal display as the color reproduction, maximum brightness, a contrast ratio, white uniformity, and a color temperature.

Existing backlight units widely used a cold cathode fluorescent lamp (CCFL) or an external electrode fluorescent lamp (EEFL) as their light source. However, the fluorescent lamps have a relatively large size, high power consumption, and low brightness. Hence, some of the recent backlight units use a light emitting diode (LED) as the light source.

The LED is more eco-friendly and has a faster response time than the fluorescent lamps. Further, color reproduction of the LED is as high as about 80 to 100%. The backlight unit using the LED as the light source (hereinafter referred to as the "LED backlight unit") has an advantage in that it can readily adjust the luminance and color temperature of the LED backlight unit by adjusting the amount of light emitted by the LED.

The LED backlight unit includes a plurality of LED arrays and a light source driving device. The LED arrays include a plurality of LED channels, and each LED channel is configured as a plurality of LEDs connected in series to one another. The LEDs are driven by the light source driving device. Examples of a method for controlling the luminance of the LEDs using the light source driving device include a pulse width modulation (PWM) control method and a pulse amplitude modulation (PAM) control method.

Figure 1:
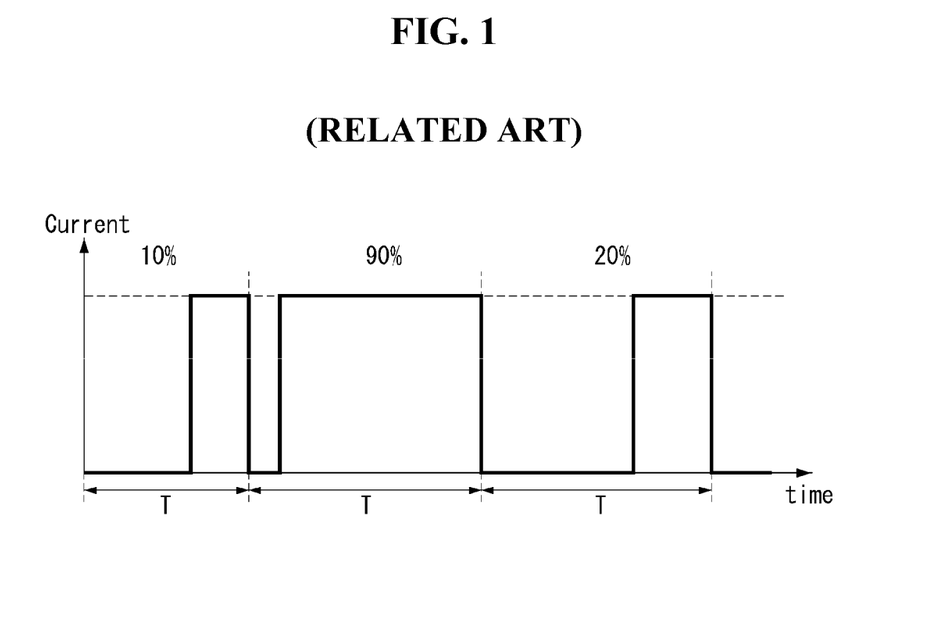
FIG. 1 shows a waveform of a pulse width modulation (PWM) signal used in a related art PWM control method.

As shown in FIG. 1, the PWM control method uniformly fixes the amplitude (indicated by the current in a graph shown in FIG. 1) of a pulse and changes the width of the pulse every predetermined period T, thereby controlling the luminance of the LEDs. The PWM control method can perform both a backlight scanning drive and a local dimming drive capable of adjusting the brightness of the LED backlight unit at a desired position by controlling the luminance of the LEDs. The backlight scanning drive means a driving method for sequentially turning on and off the light sources of the LED backlight unit along a data scan direction of the liquid crystal display panel. The local dimming drive means a backlight dimming method for dividing the LEDs into a plurality of blocks and adjusting a dimming value of each block, so as to locally control the luminance of a display surface in one frame period. Because the PWM control method controls the luminance of the LEDs using the pulse width, it is relatively easy to achieve the low luminance.

Figure 2:
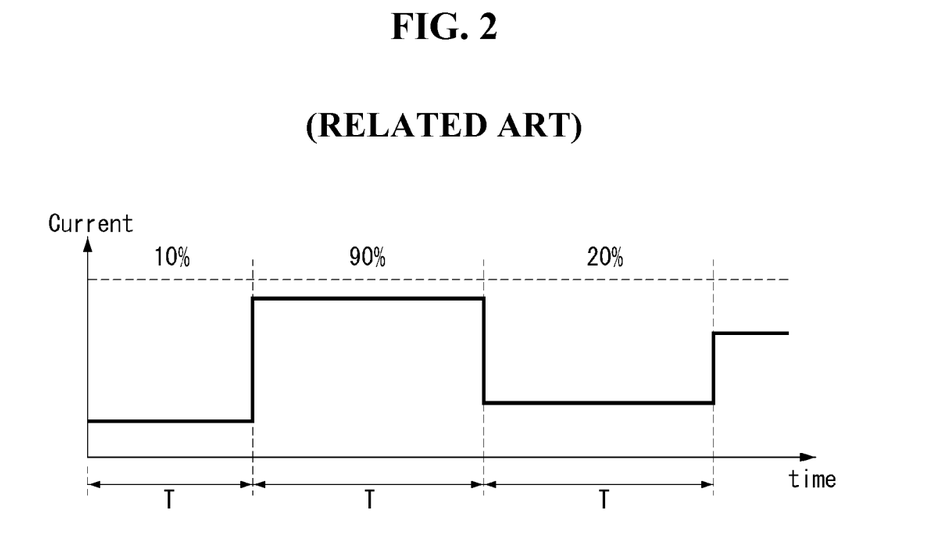
FIG. 2 shows a waveform of a pulse amplitude modulation (PAM) signal used in a related art PAM control method.

On the other hand, as shown in FIG. 2, the PAM control method uniformly fixes the width of a pulse and changes only the amplitude of the pulse every predetermined period T, thereby controlling the luminance of the LEDs. In the PAM control method, it is impossible to perform the backlight scanning drive and the local dimming drive. Further, because the PAM control method controls the luminance of the LEDs using the amplitude of the pulse, it is difficult to achieve the low luminance.

The related art light source driving device controlled the luminance of the LEDs using the PWM control method for the backlight scanning drive and the local dimming drive. However, the PWM control method has the following problems.

Figure 3A:
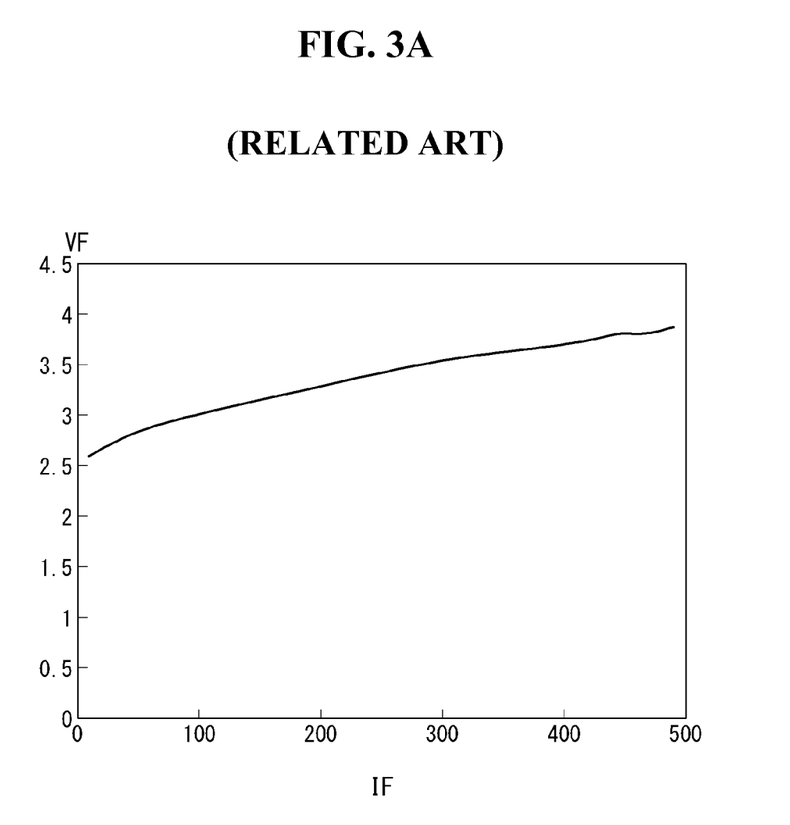
FIG. 3A shows changes in a light emitting diode (LED) forward voltage depending on a LED forward current.
Figure 3B:
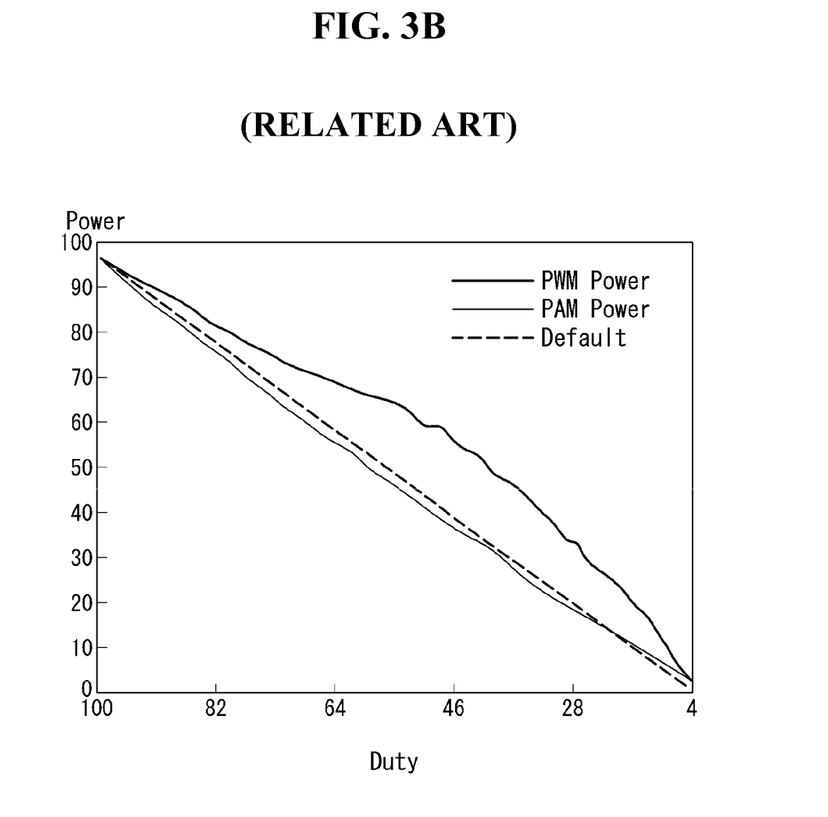
FIG. 3B shows a comparison between power consumption depending on the dimming in a PWM control method and power consumption depending on the dimming in a PAM control method.

First, as shown in FIG. 3A, in the PWM control method, the forward voltage VF between both terminals of the LED increases in proportion to the forward current IF flowing in the LED. Because the forward current IF is fixed to a predetermined maximum value in the PWM control method, the forward voltage VF in the PWM control method is greater than that in the PAM control method. Thus, as shown in FIG. 3B, the power consumption, electromagnetic interference (EMI), and heat generation in the PWM control method are greater than those in the PAM control method.

Second, the amplitude of an input/output current in the PWM control method is greater than that in the PAM control method. Hence, more noise is generated by a repetition of compression and expansion resulting from a current flowing in a circuit part.

Third, because the PWM control method turns on and off the LEDs so as to control the luminance of the LEDs, a wavy noise is generated in a display image due to the turn-on and the turn-off of light energy.

SUMMARY OF THE INVENTION

Accordingly, the present invention is directed to a backlight unit and a liquid crystal display device using the same that substantially obviate one or more of the problems due to limitations and disadvantages of the related art.

An object of the present invention is to provide a backlight unit and a liquid crystal display using the same that are capable of performing both a backlight scanning drive and a local dimming drive, and are also capable of reducing power consumption, electromagnetic interference, heat generation, noise, and wavy noise.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel comprising a plurality of pixels; a gate driving circuit to provide a gate pulse to the pixels; a data driving circuit to provide a data voltage to the pixels; a timing controller to provide control signals to the data driving circuit and gate driving circuit; and a backlight unit to provide light to the liquid crystal panel, the backlight unit including, a light source having at least one LED channel, a driving voltage generator to supply a driving voltage to the at least one LED channel, and an LED driver to receive control information from an external source and to supply a conditional pulse width and amplitude modulation (CP-WAM) signal to the LED channel, wherein the CPWAM signal has a pulse with an amplitude and a width that are both variable from one period of a predetermined length to another period of the predetermined length.

In another aspect of the present invention, a backlight unit for use with a liquid crystal display device includes: a light source having at least one LED channel; a driving voltage generator to supply a driving voltage to the LED channel; and an LED driver to receive control information from an external source and to supply a conditional pulse width and amplitude modulation (CPWAM) signal to the at least one LED channel, wherein the CPWAM signal has a pulse with an amplitude and width that are both variable from one period of a predetermined length to another period of the predetermined length.

In yet another aspect of the present invention, in a liquid crystal display device comprising a liquid crystal display panel including a plurality of pixels and a light source having at least one LED channel to provide light to the liquid crystal panel based on luminance control information from an external source, a method of driving the light source includes: generating a conditional pulse width and amplitude modulation (CPWAM) signal based on the luminance information, wherein the CPWAM signal has a pulse with an amplitude and width that are both variable from one period of a predetermined length to another period of the predetermined length; and supplying the CPWAM signal to the LED channel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

Exemplary embodiments of the invention will be described with reference to FIGS. 4 to 11.

Figure 4:
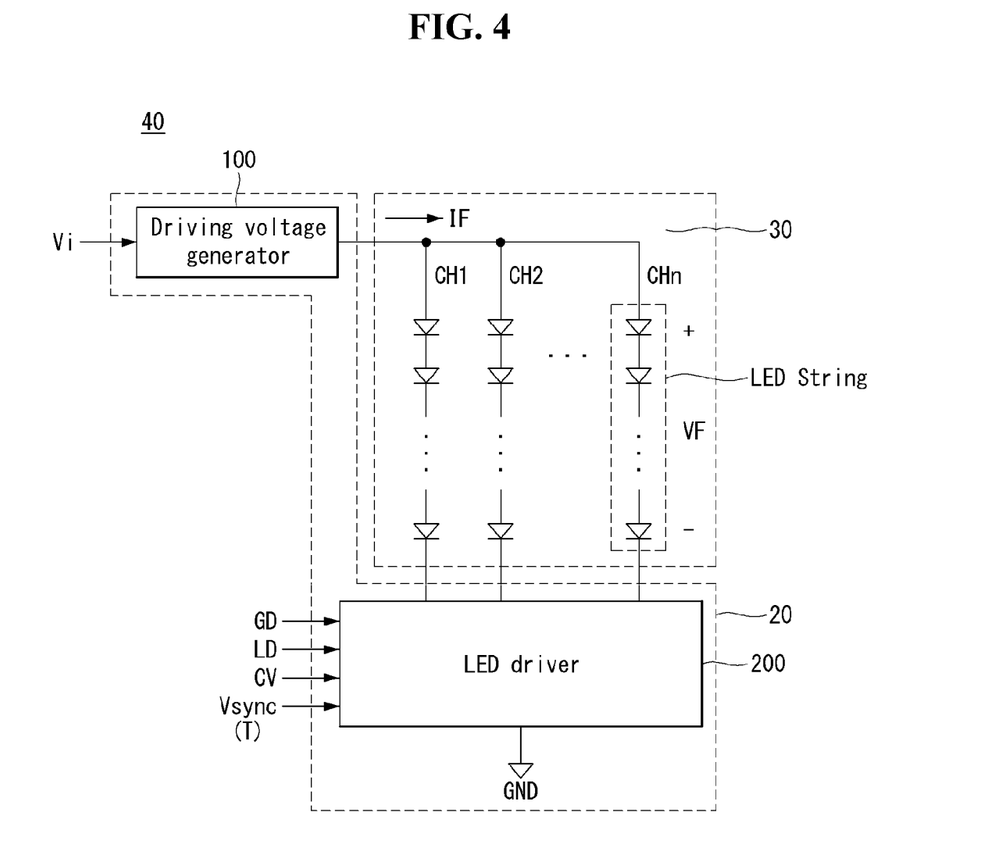
FIG. 4 schematically shows an example configuration of a backlight unit according to an exemplary embodiment of the invention.
Figure 5:
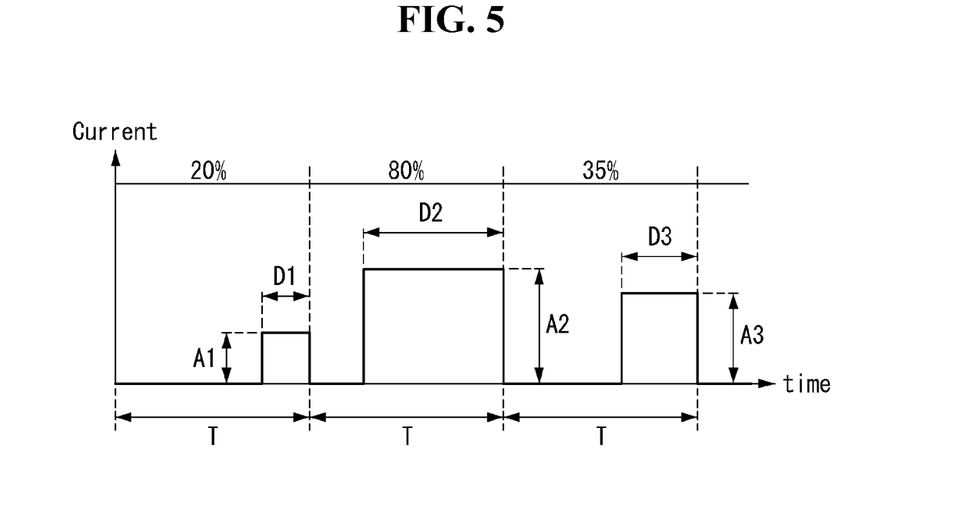
FIG. 5 shows an example of a conditional pulse width and amplitude modulation (CPWAM) signal according to an exemplary embodiment of the invention.

FIG. 4 schematically shows an example configuration of a backlight unit to which a light source driving device according to an exemplary embodiment of the invention is applied. FIG. 5 shows an example of a conditional pulse width and amplitude modulation (CPWAM) signal according to the embodiment of the invention.

As shown in FIG. 4, a backlight unit 40 according to the embodiment of the invention includes a light emitting diode (LED) array 30 having a plurality of LED channels CH1 to CHn and a light source driving device 20 for driving the LED channels CH1 to CHn. The light source driving device 20 includes a driving voltage generator 100 and a LED driver 200.

Figure 9:
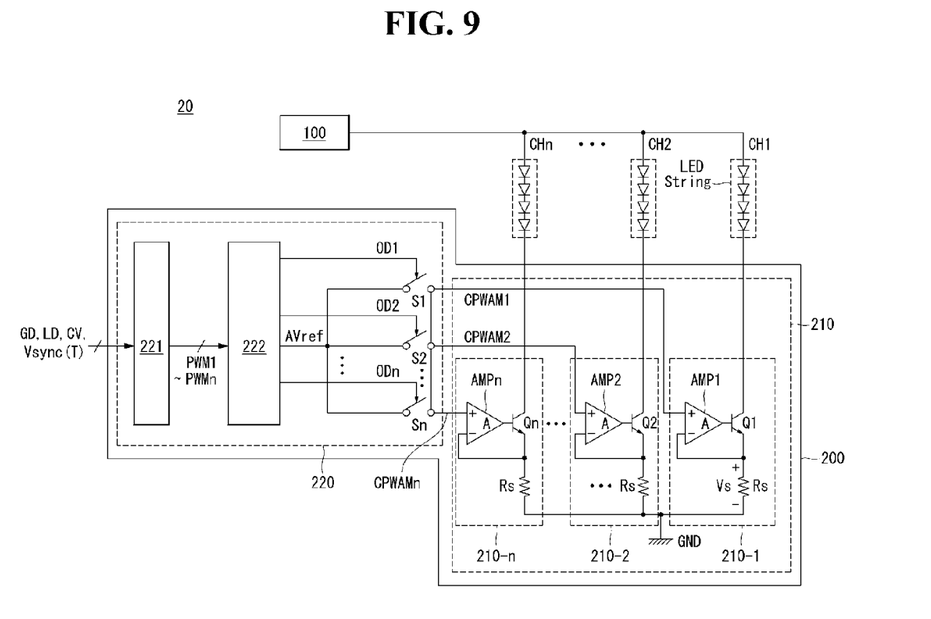
FIG. 9 shows in detail an example configuration of a LED driver according to an exemplary embodiment of the invention.

Each of the LED channels CH1 to CHn included in the LED array 30 is configured as a LED string including a plurality of LEDs connected in series to one another. The LED channels CH1 to CHn each have one terminal (for example, the anode electrode of the uppermost LED) commonly connected to the driving voltage generator 100 and the other terminal (for example, the cathode electrode of the lowermost LED) individually connected to the LED driver 200. The LEDs of each LED channel emit light based on a driving current IF generated from the driving voltage generator 100. As shown in FIG. 9, constant current drivers 210-1 to 210-n are each connected to the other terminal of the corresponding one of the LED channels CH1 to CHn. Hence, each constant current driver determines a level of the driving current IF flowing in the corresponding LED channel.

The driving voltage generator 100 boosts a DC input voltage Vi and generates a driving voltage VF and the driving current IF. The driving voltage VF output from the driving voltage generator 100 is commonly applied to the one terminal of each of the LED channels CH1 to CHn.

The LED driver 200 receives luminance control information GD, LD, CV, and Vsync from an external system so as to control a luminance of the LED channels CH1 to CHn. The luminance control information GD, LD, CV, and Vsync includes a global dimming value GD which is variable every period T having a predetermined length, a local dimming value LD which is variable every period T, a fixed current value CV, and a vertical sync signal Vsync defining the period T. In the embodiment disclosed herein, the local dimming value LD indicates individual dimming values applied to the LED channels CH1 to CHn in each period synchronized with the vertical sync signal Vsync. The global dimming value GD may be differently set in each period. In each period, a maximum value of the local dimming values LD of the LED channels CH1 to CHn may be set as the global dimming value GD. The fixed current value CV is defined as a current value corresponding to a fixed amplitude of pulse width modulation (PWM) signals. Because each period is synchronized with the vertical sync signal Vsync, one period may be set as one frame period.

The LED driver 200 generates the PWM signal of each LED channel every period T based on the luminance control information GD, LD, CV, and Vsync. The LED driver 200 extracts the PWM signal having a maximum on-duty among the PWM signals of the LED channels included in the same period and generates a conditional pulse width and amplitude modulation (CPWAM) signal of each LED channel based on the extracted PWM signal with the maximum on-duty. The LED driver 200 applies the CPWAM signal to each of the LED channels CH1 to CHn. In the embodiment disclosed herein, both a pulse amplitude and a pulse width (on-duty) of the CPWAM signal applied to each LED channel are variable from one period T having a predetermined length to another period T.

FIG. 5 shows an example of the CPWAM signal applied to one of the LED channels CH1 to CHn. Both a pulse amplitude and a pulse width of the CPWAM signal may vary every period T depending on a dimming value implemented in the corresponding LED channel. For example, as shown in FIG. 5, the dimming value implemented in the corresponding LED channel can vary for every period T, in this example changing from 20% to 80%, and then to 35%. In this instance, the CPWAM signal having a first pulse amplitude A1 and a first pulse width D1 may be generated so that the dimming value of 20% is implemented in a first period T. Then, the CPWAM signal having a second pulse amplitude A2 (A2>A1) and a second pulse width D2 (D2>D1) may be generated so that the dimming value of 80% is implemented in a second period T, followed by the CPWAM signal having a third pulse amplitude A3 (A1<A3<A2) and a third pulse width D3 (D1<D3<D2) so that the dimming value of 35% is implemented in a third period T.

The CPWAM signal shown in FIG. 5 is merely an example, and thus the embodiment of the invention is not limited thereto. Different sequences of dimming values may be implemented and the CPWAM signal with the corresponding pulse width and amplitude may be generated. The LED driver 200 according to this embodiment of the invention generates the CPWAM signal so that the same luminance as the PWM signal is implemented based on the PWM signal, which is internally generated based on the luminance control information GD, LD, CV, and Vsync. The LED driver 200 modulates both the pulse amplitude and the pulse width of the CPWAM signal depending on changes in the dimming value as the dimming value may change every period T, unlike the PWM signal. As a result, the embodiment of the invention readily modulates the pulse width in one period and thus can perform both a backlight scanning drive and a local dimming drive. Furthermore, the embodiment of the invention can readily modulate the pulse amplitude in one period and thus can reduce such harmful effects as power consumption, electromagnetic interference, heat generation, a noise, and a wavy noise.

Figure 6:
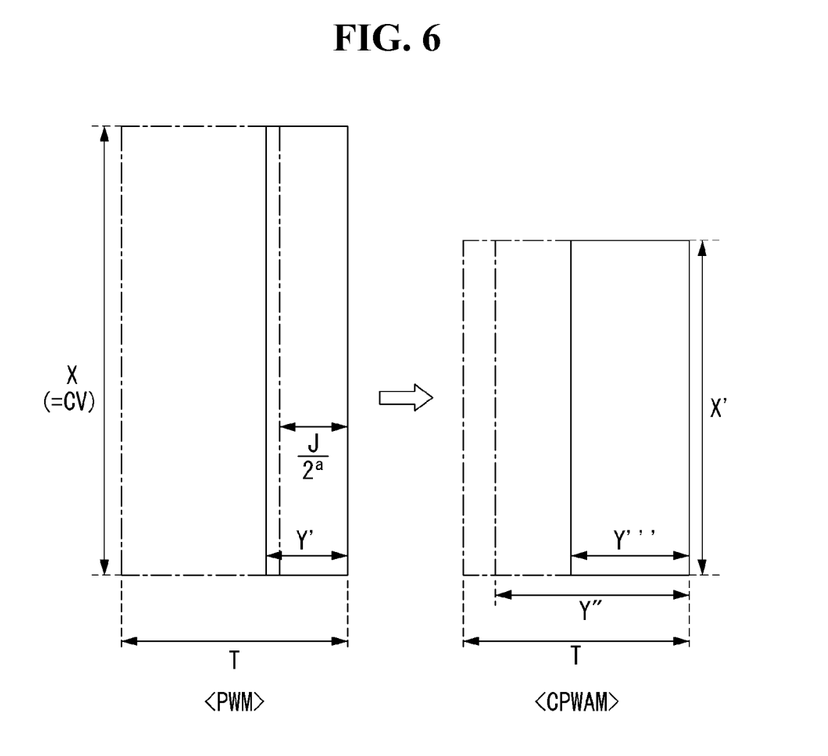
FIG. 6 shows a relationship between a PWM signal and a CPWAM signal generated in a LED driver.
Figure 7:
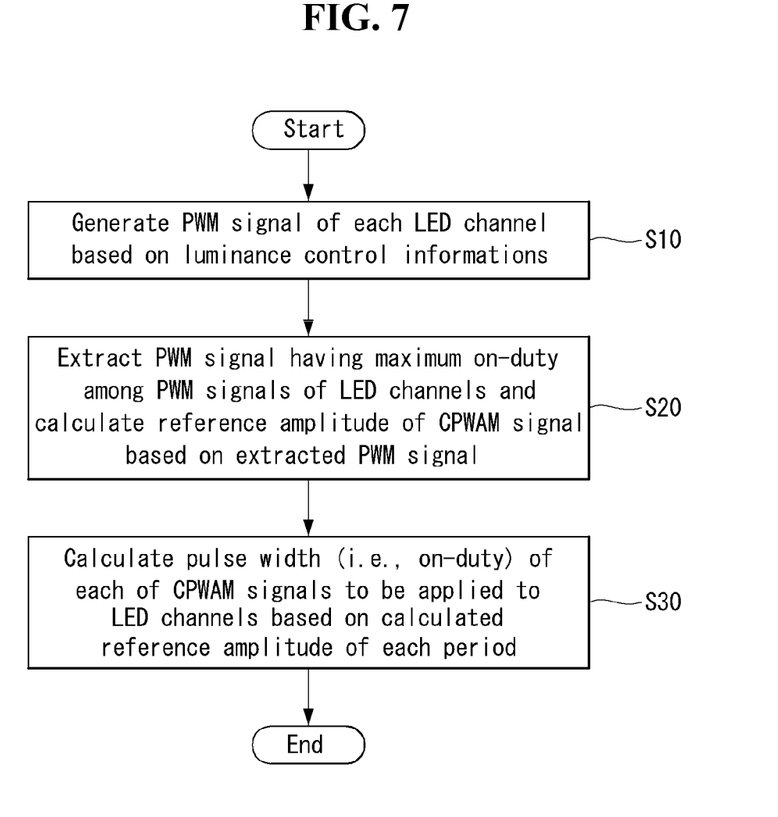
FIG. 7 shows a method for generating a CPWAM signal in a LED driver.

FIG. 6 shows an example relationship between the PWM signal and the CPWAM signal generated in the LED driver 200. FIG. 7 shows a method for generating the CPWAM signal in the LED driver 200 according to an embodiment of the present invention.

As shown for example in FIGS. 6 and 7, the LED driver 200 generates the PWM signal of each LED channel every period T based on the luminance control information GD, LD, CV, and Vsync in step S10. The PWM signal of one LED channel in a given period T is shown in FIG. 6. The amplitude X of the PWM signal is set so that it corresponds to a predetermined value, i.e., the fixed current value CV in the same manner as in a related art. In FIG. 6, Y' denotes a pulse width of the PWM signal, and $J/2^a$ denotes a local dimming value of one LED channel in the period T with a predetermined length, where 'a' is the number of data bits, and T is a value between 0 and $2^a$.

The LED driver 200 then generates the CPWAM signal, which has a reference amplitude X' less than the amplitude X of the PWM signal corresponding to the one LED channel based on the PWM signals of all of the LED channels in the given period T, thereby solving the problem generated in the related art while implementing the same luminance as the PWM signal. The CPWAM signal of the one LED channel generated based on the PWM signals of the LED channels in the period T is shown in FIG. 6. In the period T, a luminance implemented through the CPWAM signal of the one LED channel has to be equal to a luminance implemented through the PWM signal of the one LED channel. For this, the LED driver 200 calculates the reference amplitude X' of the CPWAM signal commonly used in all of the LED channels in the period T and calculates a pulse width Y''' of each of the CPWAM signals to be applied to the corresponding LED channels in the period T based on the reference amplitude X' of the period T.

More specifically, the LED driver 200 extracts the PWM signal having a maximum on-duty among the PWM signals of the LED channels included in the period T and calculates the reference amplitude X' of the CPWAM signal in the period T based on the extracted PWM signal according to the following Equation 1 in step S20:

$$X' = \frac{X \times Y' \times \frac{L/D_{max}}{2^a}}{Y''} \qquad \text{[Equation 1]}$$

In the above Equation 1, Y'' is a maximum pulse width of the CPWAM signal which is previously determined, and is set to be less than a length of one period for the scanning drive and the local dimming drive. "$(L/D_{max})/2^a$" is a maximum local dimming value, where 'a' is the number of dimming data bits. For example, when 'a' is 8, $(L/D_{max})$ is a value between 0 and 255. Because Y'' is the previously determined value and "$X*Y'*(L/D_{max})/2^a$" is a value known through the PWM signal of the maximum on-duty, the reference amplitude X' of the CPWAM signal in the period T may be readily calculated. The calculated reference amplitude X' is used as the amplitude of all of the CPWAM signals to be applied to the LED channels in the period T.

Subsequently, the LED driver 200 calculates the pulse width (i.e., on-duty) Y''' of each of the CPWAM signals to be applied to the LED channels based on the calculated reference amplitude X' of each period according to the following Equation 2 in step S30:

$$Y''' = \frac{X \times Y' \times \frac{J}{2^a}}{X'}$$ [Equation 2]

In the above Equation 2, "$J/2^a$" is one local dimming value of the LED channels that is less than the maximum local dimming value, where 'a' is the number of dimming data bits. For example, when 'a' is 8, T is a value between 0 and 255 and is less than ($L/D_{max}$). Because X' is a value known through the above Equation 1 and "$X*Y'*(J)/2^a$" is a value known through the PWM signal of each LED channel, the pulse width Y''' of the CPWAM signal corresponding to each LED channel in the period T may be readily calculated.

Figure 8A:
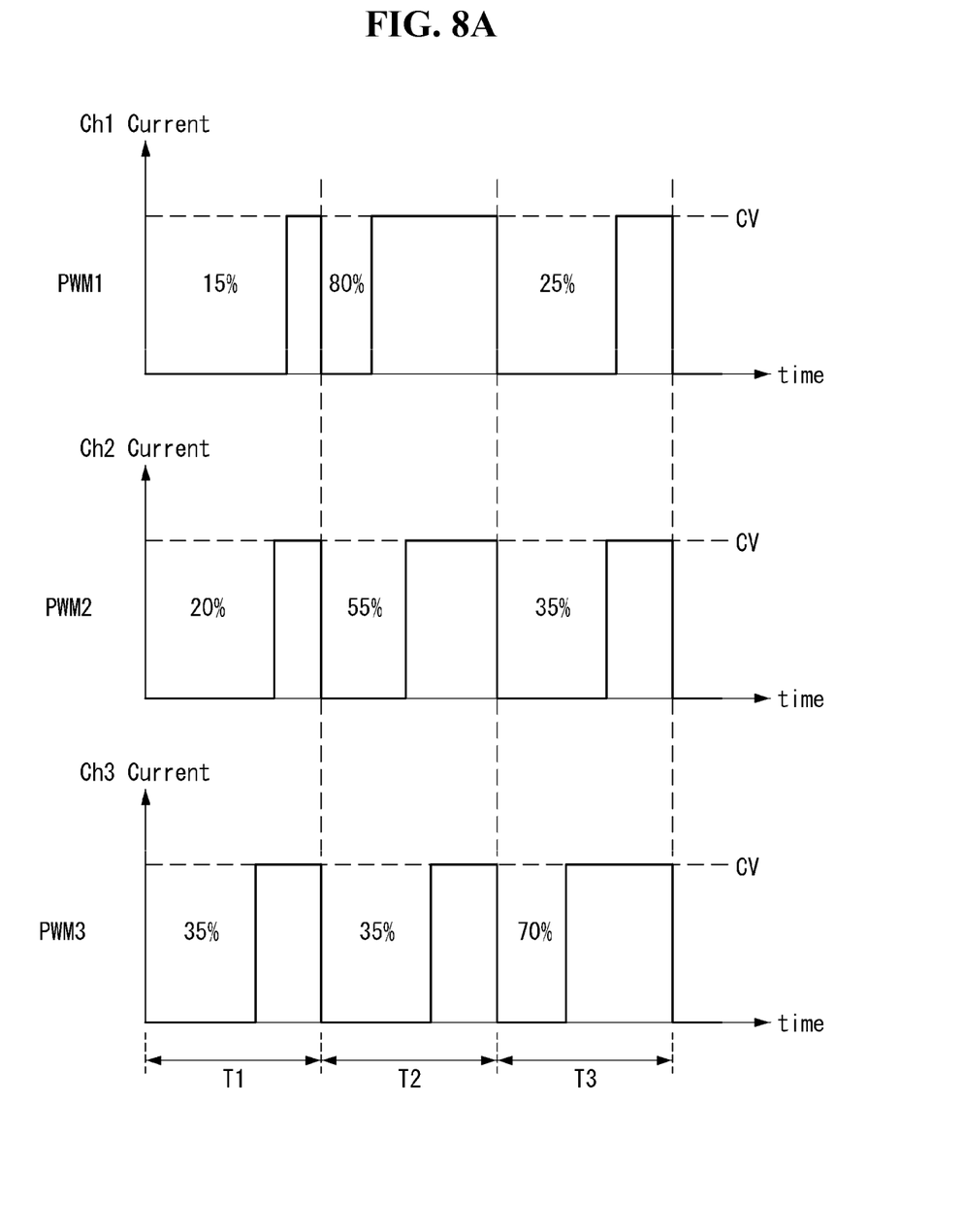
FIG. 8A shows PWM signals respectively corresponding to LED channels.
Figure 8B:
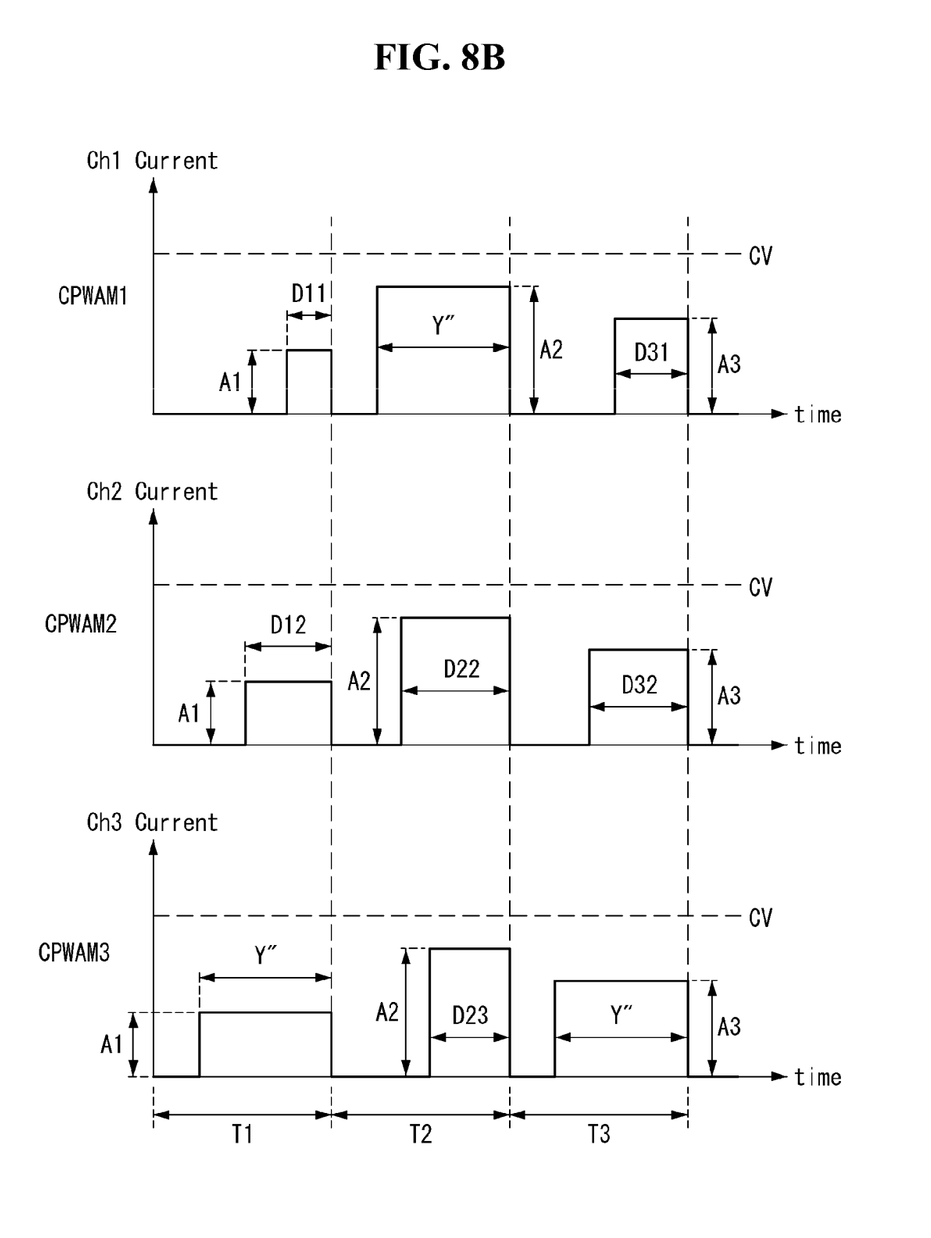
FIG. 8B shows an example of CPWAM signals of LED channels generated based on PWM signals of the LED channels in each period.

FIG. 8A shows an example of the PWM signals respectively corresponding to the LED channels. FIG. 8B shows an example of the CPWAM signals of the LED channels generated based on the corresponding PWM signals of the LED channels in each period through the generation method shown in FIG. 7. In FIGS. 8A and 8B, PWM1 and CPWAM1 are signals corresponding to a dimming value for controlling a first LED channel Ch1; PWM2 and CPWAM2 are signals corresponding to a dimming value for controlling a second LED channel Ch2; and PWM3 and CPWAM3 are signals corresponding to a dimming value for controlling a third LED channel Ch3.

First, a process for generating the CPWAM1 to CPWAM3 signals to be respectively applied to the first to third LED channels Ch1 to Ch3 in a first period T1 according to an embodiment of the present invention is described below.

The LED driver 200 calculates the first reference amplitude A1 to commonly apply to the CPWAM1 to CPWAM3 signals in the first period T1, based on the PWM3 signal which has the maximum on-duty among the PWM1 to PWM3 signals generated in the first period T1. More specifically, the LED driver 200 calculates the first reference amplitude A1 based on a condition (refer to the above Equation 1) that a current-time area of the CPWAM3 signal having the maximum pulse width Y", which is previously determined during the first period T1, is equal to a current-time area of the PWM3 signal in the first period T1.

The LED driver 200 calculates a pulse width of each of the CPWAM1 and CPWAM2 signals using the first reference amplitude A1, which is commonly applied to the CPWAM1 to CPWAM3 signals in the first period T1. More specifically, the LED driver 200 calculates a pulse width D11 of the CPWAM1 signal based on a condition (refer to the above Equation 2) that a current-time area of the CPWAM1 signal having the first reference amplitude A1 is equal to a current-time area of the PWM1 signal in the first period T1. Further, the LED driver 200 calculates a pulse width D12 of the CPWAM2 signal based on a condition (refer to the above Equation 2) that a current-time area of the CPWAM2 signal having the first reference amplitude A1 is equal to a current-time area of the PWM2 signal in the first period T1.

Next, a process for generating the CPWAM1 to CPWAM3 signals to be respectively applied to the first to third LED channels Ch1 to Ch3 in a second period T2 according to an embodiment of the present invention is described below.

The LED driver 200 calculates the second reference amplitude A2 to commonly apply to the CPWAM1 to CPWAM3 signals in the second period T2, based on the PWM1 signal which has the maximum on-duty among the PWM1 to PWM3 signals generated in the second period T2. More specifically, the LED driver 200 calculates the second reference amplitude A2 based on a condition (refer to the above Equation 1) that a current-time area of the CPWAM1 signal having the maximum pulse width Y", which is previously determined during the second period T2, is equal to a current-time area of the PWM1 signal in the second period T2.

The LED driver 200 calculates a pulse width of each of the CPWAM2 and CPWAM3 signals using the second reference amplitude A2, which is commonly applied to the CPWAM1 to CPWAM3 signals in the second period T2. More specifically, the LED driver 200 calculates a pulse width D22 of the CPWAM2 signal based on a condition (refer to the above Equation 2) that a current-time area of the CPWAM2 signal having the second reference amplitude A2 is equal to a current-time area of the PWM2 signal in the second period T2. Further, the LED driver 200 calculates a pulse width D23 of the CPWAM3 signal based on a condition (refer to the above Equation 2) that a current-time area of the CPWAM3 signal having the second reference amplitude A2 is equal to a current-time area of the PWM3 signal in the second period T2.

Next, a process for generating the CPWAM1 to CPWAM3 signals to be respectively applied to the first to third LED channels Ch1 to Ch3 in a third period T3 according to an embodiment of the present invention is described below.

The LED driver 200 calculates a third reference amplitude A3 to commonly apply to the CPWAM1 to CPWAM3 signals in the third period T3, based on the PWM3 signal which has the maximum on-duty among the PWM1 to PWM3 signals generated in the third period T3. More specifically, the LED driver 200 calculates the third reference amplitude A3 based on a condition (refer to the above Equation 1) that a current-time area of the CPWAM3 signal having the maximum pulse width Y", which is previously determined during the third period T3, is equal to a current-time area of the PWM3 signal in the third period T3.

The LED driver 200 calculates a pulse width of each of the CPWAM1 and CPWAM2 signals using the third reference amplitude A3, which is commonly applied to the CPWAM1 to CPWAM3 signals in the third period T3. More specifically, the LED driver 200 calculates a pulse width D31 of the CPWAM1 signal based on a condition (refer to the above Equation 2) that a current-time area of the CPWAM1 signal having the third reference amplitude A3 is equal to a current-time area of the PWM1 signal in the third period T3. Further, the LED driver 200 calculates a pulse width D32 of the CPWAM2 signal based on a condition (refer to the above Equation 2) that a current-time area of the CPWAM2 signal having the third reference amplitude A3 is equal to a current-time area of the PWM2 signal in the third period T3.

In an embodiment disclosed herein, the first to third reference amplitudes A1, A2, and A3 increase in proportion to the maximum on-duty (i.e., the dimming value) of the PWM1 to PWM3 signals. In the above example, the second reference amplitude A2 is greater than the third reference amplitude A3, and the third reference amplitude A3 is greater than the first reference amplitude A1. In particular, the first to third reference amplitudes A1, A2, and A3 are less than the pulse amplitude (i.e., the fixed current value CV) commonly applied to the PWM1 to PWM3 signals. This results in an efficient reduction of such harmful effects as the power consumption, the electromagnetic interference, the heat generation, the noise, and the wavy noise.

Figure 10:
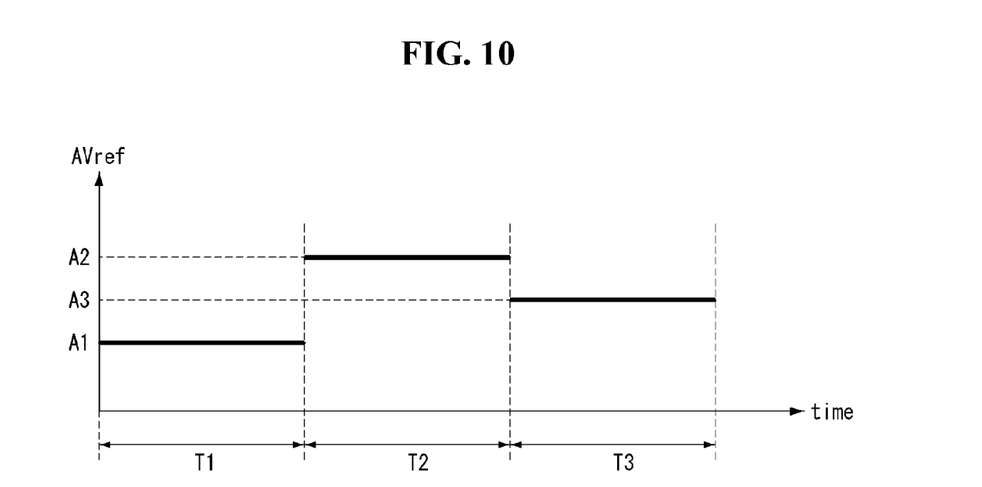
FIG. 10 shows an example where a level of a reference voltage changes every predetermined period.

FIG. 9 shows in detail an example configuration of the LED driver 200 according to an embodiment of the invention. FIG. 10 shows an example where a level of a reference voltage changes every period T having a predetermined length.

As shown in FIG. 9, the LED driver 200 according to an embodiment of the invention includes a constant current driver circuit 210 having a plurality of constant current drivers 210-1 to 201-n. The first to n-th constant current drivers 210-1 to 210-n are respectively connected to the first to n-th LED channels CH1 to CHn. The first to n-th constant current drivers 210-1 to 210-n are also each connected an input terminal of a ground level voltage GND and to a CPWAM controller 220 which generates the first to n-th CPWAM signals CPWAM1 to CPWAMn to control operations of the constant current drivers 210-1 to 210-n, respectively.

For example, the first constant current driver 210-1 includes a first amplifier AMP1 having a gain 'A', a first driving transistor Q1, and a detection resistor Rs. An output terminal of the first amplifier AMP1 is connected to a base of the first driving transistor Q1, and an inverting terminal (−) of the first amplifier AMP1 is connected to an emitter of the first driving transistor Q1. A non-inverting terminal (+) of the first amplifier AMP1 is connected to a CPWAM controller 220 and receives a reference voltage AVref from the CPWAM controller 220. As shown in FIG. 10, the reference voltage AVref may vary in each of the first to third periods T1, T2, and T3, and thus the reference amplitude may vary in each of the first to third periods T1, T2, and T3. A detection voltage Vs between both terminals of the detection resistor Rs is fed back to the inverting terminal (−) of the first amplifier AMP1. A difference between the reference voltage AVref and the detection voltage Vs is amplified to the gain 'A' and is applied to the base of the first driving transistor Q1. The first constant current driver 210-1 uniformly holds a first LED forward current determined based on a level (the reference amplitude of the CPWAM1 signal of each period) of the reference voltage AVref and a supply period (the pulse width of the CPWAM1 signal) of the reference voltage AVref, and applies the first LED forward current to the first LED channel CH1.

The second constant current driver 210-2 has a configuration similar to the first constant current driver 210-1. The second constant current driver 210-2 uniformly holds a second LED forward current determined based on a level (the reference amplitude of the CPWAM2 signal of each period) of the reference voltage AVref and a supply period (the pulse width of the CPWAM2 signal) of the reference voltage AVref, and applies the second LED forward current to the second LED channel CH2.

In the same manner, the n-th constant current driver 210-n has a configuration similar to the first constant current driver 210-1 and second constant current driver 210-2. The n-th constant current driver 210-n uniformly holds an nth LED forward current determined based on a level (the reference amplitude of the CPWAMn signal of each period) of the reference voltage AVref and a supply period (the pulse width of the CPWAMn signal) of the reference voltage AVref, and applies the nth LED forward current to the nth LED channel CHn.

The CPWAM controller 220 includes a PWM generator 221, a CPWAM generator 222, and first to n-th switches S1 to Sn.

The PWM generator 221 generates the PWM signal of each LED channel based on the luminance control information GD, LD, CV, and Vsync as shown in FIG. 8A. The CPWAM generator 222 generates the CPWAM signals CPWAM1 to CPWAMn using the method shown in FIGS. 7, 8A, and 8B and detailed above, and then supplies the CPWAM signals to the constant current drivers 210-1 to 210-n, respectively. The CPWAM generator 222 calculates the reference amplitude of the CPWAM signals for each period and sets the level of the reference voltage AVref for each period. The CPWAM generator 222 calculates the respective pulse widths of the CPWAM signals and accordingly sets on-duty signals OD1 to ODn to turn on the first to n-th switches S1 to Sn for the duration corresponding to the respective pulse widths of the CPWAM signals. As shown in FIG. 8B, each of the CPWAM signals has the pulse amplitude and the pulse width, each of which is individually set in each period. In this instance, the pulse amplitude is determined based on the level of the reference voltage AVref, and the pulse width is determined based on the on-duty.

Figure 11:
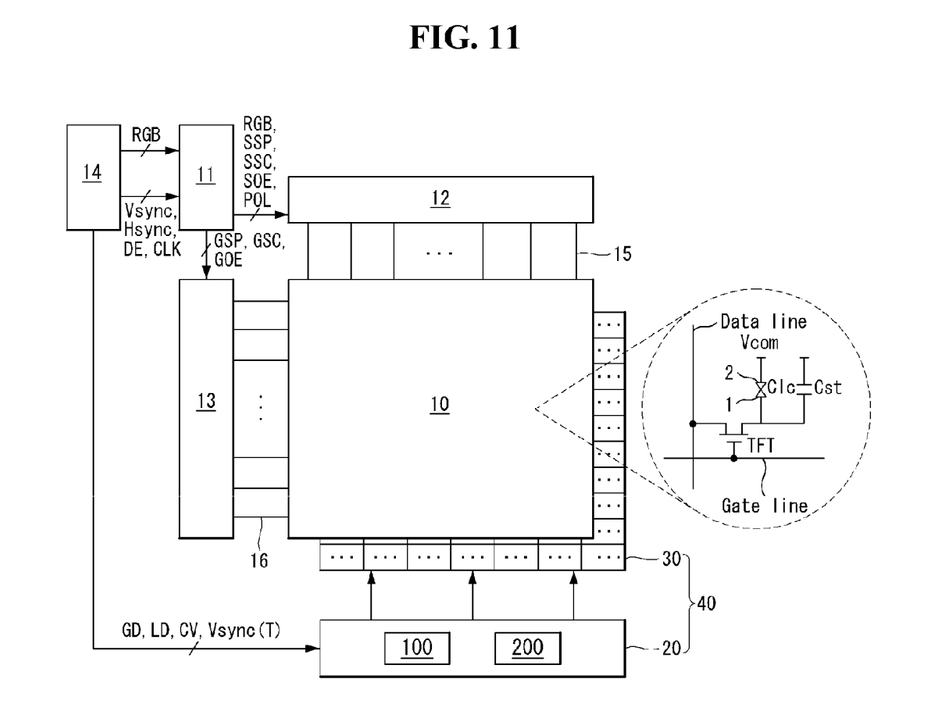
FIG. 11 shows a liquid crystal display including a backlight unit according to an exemplary embodiment of the invention.

FIG. 11 shows a liquid crystal display including the light source driving device according to an embodiment of the invention.

As shown in FIG. 11, the liquid crystal display according to this embodiment of the invention includes a liquid crystal display panel 10, a timing controller 11, a data driving circuit 12, a gate driving circuit 13, a host system 14, and the backlight unit 40.

The liquid crystal display panel 10 includes a lower glass substrate (not shown), an upper glass substrate (not shown), and a liquid crystal layer (not shown) formed between the lower glass substrate and the upper glass substrate. The liquid crystal display panel 10 includes liquid crystal cells Clc which are arranged in a matrix form at the intersections of data lines 15 and gate lines 16. A pixel array is formed on the lower glass substrate of the liquid crystal display panel 10. The pixel array includes the liquid crystal cells (i.e., pixels) Clc formed at the intersections of the data lines 15 and the gate lines 16, thin film transistors connected to pixel electrodes 1 of the pixels, common electrodes 2 positioned opposite the pixel electrodes 1, and storage capacitors Cst. Each liquid crystal cell Clc is connected to a TFT and is driven by an electric field between the pixel electrode 1 and the common electrode 2. Black matrixes, and red, green, and blue color filters, among other things, may be formed on the upper glass substrate of the liquid crystal display panel 10. Polarizing plates may be respectively attached to the upper and lower glass substrates of the liquid crystal display panel 10. Alignment layers for setting a pre-tilt angle of liquid crystals may respectively be formed on the upper and lower glass substrates of the liquid crystal display panel 10. The common electrodes 2 may be formed on the upper glass substrate in a device utilizing a vertical electric field driving mode, such as a twisted nematic (TN) mode and a vertical alignment (VA) mode. The common electrodes 2 may be formed on the lower glass substrate along with the pixel electrodes 1 in a device employing a horizontal electric field driving manner, such as an in-plane switching (IPS) mode and a fringe field switching (FFS) mode.

The liquid crystal display panel 10 forms an electric field in the liquid crystal cell depending on a pixel voltage supplied to each pixel and adjusts a transmittance of light provided by the backlight unit 40, thereby displaying an image.

The timing controller 11 receives digital video data RGB of an input image from a host system 14 through a low voltage differential signaling (LVDS) interface and supplies the digital video data RGB of the input image to the data driving circuit 12 through a mini LVDS interface. The timing controller 11 arranges the digital video data RGB received from the host system 14 in conformity with a disposition configuration of the pixel array and then supplies the arranged digital video data RGB to the data driving circuit 12.

The timing controller 11 also receives timing signals, such as a vertical sync signal Vsync, a horizontal sync signal Hsync, a data enable signal DE, and a dot clock DCLK, from the host system 14, and generates control signals for controlling the operation timings of the data driving circuit 12 and the gate driving circuit 13. The control signals include a gate timing control signal for controlling the operation timing of the gate driving circuit 13 and a source timing control signal for controlling the operation timing of the data driving circuit 12.

The gate timing control signals may include, among other things, a gate start pulse GSP, a gate shift clock GSC, and a gate output enable signal GOE. The gate start pulse GSP is applied to a gate driver integrated circuit (IC) and controls the gate driver IC to generate a first gate pulse. The gate shift clock GSC is commonly input to gate driver ICs of the gate driver 13 and shifts the gate start pulse GSP. The gate output enable signal GOE controls an output of the gate driver ICs.

The source timing control signals may include, among other things, a source start pulse SSP, a source sampling clock SSC, a polarity control signal POL, a source output enable signal SOE, etc. The source start pulse SSP controls a data sampling start timing of the data driving circuit 12. The source sampling clock SSC controls a sampling timing of data in the data driving circuit 12 based on its rising or falling edge. The polarity control signal POL controls the polarities of data voltages sequentially output from each of source driver ICs of the data driving circuit 12. The source output enable signal SOE controls the output timing of the data driving circuit 12.

The data driving circuit 12 includes, among other things, a shift register, a latch array, a digital-to-analog converter, and an output circuit. The data driving circuit 12 latches the digital video data RGB in response to the source timing control signals and converts the latched digital video data RGB into positive and negative analog gamma compensation voltages. The data driving circuit 12 then supplies the data voltages, of which polarities are inverted every period of a predetermined length, to the data lines 15 through a plurality of output channels.

The gate driving circuit 13 generates a gate pulse in response to the gate timing control signals using a shift register and a level shifter and then supplies the gate pulse to the gate lines 16 in a line sequential manner. The shift register of the gate driving circuit 13 may be directly formed on the lower glass substrate of the liquid crystal display panel 10 through a gate driver-in panel (GIP) process.

The backlight unit 40 includes the LED array 30 having the plurality of LED channels CH1 to CHn and the light source driving device 20 for driving the LED channels CH1 to CHn. The light source driving device 20 includes the driving voltage generator 100 and the LED driver 200. The LED driver 200 generates the CPWAM signals according to an embodiment of the invention, of which the pulse amplitude and the pulse width modulate every period of a predetermined length based on the luminance control information GD, LD, CV, and Vsync received from the host system 14. The LED driver 200 then applies the CPWAM signals to the LED channels CH1 to CHn. An example configuration of the LED driver 200 is described above in detail with reference to FIGS. 4 to 10.

As described above, the embodiment of the invention modulates both the pulse width and the pulse amplitude of the CPWAM signals in one period, so as to implement the desired luminance. Because the pulse width of the CPWAM signal is modulated according to the embodiment of the invention in one period, both the backlight scanning drive and the local dimming drive may be performed. Further, because the pulse amplitude of the CPWAM signal is also modulated according to the embodiment of the invention in one period, such harmful effects as the power consumption, the electromagnetic interference, the heat generation, the noise, and the wavy noise may be efficiently reduced.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
 a liquid crystal display panel comprising a plurality of pixels;
 a gate driving circuit to provide a gate pulse to the pixels;
 a data driving circuit to provide a data voltage to the pixels;
 a timing controller to provide control signals to the data driving circuit and the gate driving circuit; and
 a backlight unit to provide light to the liquid crystal panel, the backlight unit including:
  a light source having at least one LED channel;
  a driving voltage generator to supply a driving voltage to the at least one LED channel; and
  an LED driver to receive control information from an external source and to supply a conditional pulse width and amplitude modulation (CPWAM) signal to the LED channel based on the control information,
 wherein the CPWAM signal has a pulse with an amplitude and a width that are both variable from one period of a predetermined length to another period of the predetermined length, and
 wherein the control information includes a global dimming value, a local dimming value, a fixed current value, and a vertical sync signal defining the predetermined length of the one period.

2. The liquid crystal display device of claim 1, wherein the one period of the predetermined length is one frame period of the liquid crystal display device.

3. The liquid crystal display device of claim 1, wherein the LED channel includes a plurality of LEDs connected in series.

4. The liquid crystal display device of claim 1, wherein the LED driver includes:
 a CPWAM controller to generate the CPWAM signal; and
 a constant current driver to hold a current supplied to the LED channel substantially constant during the one period based on the CPWAM signal.

5. The liquid crystal display device of claim 4, wherein the light source has a plurality of LED channels, the said LED channel being one of the LED channels, and wherein the CPWAM controller includes:
 a PWM generator to generate a plurality of pulse width modulation (PWM) signals within the one period, each PWM signal corresponding to a respective one of the LED channels and having a pulse with a fixed amplitude and a variable width;

a CPWAM generator to determine the PWM signal with the largest pulse width among the PWM signals, to determine a reference voltage based on the largest pulse width, the reference voltage defining the amplitude of the CPWAM signal, and to determine the pulse width of the CPWAM signal based on the reference voltage and the pulse width of one of the PWM signals corresponding to the said LED channel, and to generate an on-duty signal based on the pulse width of the CPWAM signal; and a switch to supply the reference voltage to the constant current driver for a duration based on the on-duty signal.

6. The liquid crystal display device of claim 5, wherein the constant current driver includes:

an amplifier, a driving transistor, and a detection resistor, the amplifier having an inverting terminal coupled to an emitter of the driving transistor, a non-inverting terminal coupled to the CPWAM generator through the switch to receive the reference voltage from the CPWAM generator, and an output coupled to a base of the first driving transistor, the driving transistor having a collector coupled to the said LED channel; and the detection resistor having one end coupled to the emitter of the driving transistor and the other end coupled to a ground voltage.

7. The liquid crystal display device of claim 1, wherein the local dimming value for the LED channel is $J/2^a$, where "a" is a number of dimming data bits, and "J" is a value between 0 and $2^a$.

8. A backlight unit for use with a liquid crystal display device, the backlight unit comprising:

a light source having a plurality of LED channels;

a driving voltage generator to supply a driving voltage to at least one of the LED channels; and an LED driver to receive control information from an external source and to supply a conditional pulse width and amplitude modulation (CPWAM) signal to the at least one LED channel based on the control information, the LED driver including:

a CPWAM controller to generate the CPWAM signal, the CPWAM signal having a pulse with an amplitude and width that are both variable from one period of a predetermined length to another period of the predetermined length, the CPWAM controller comprising:

a PWM generator to generate a plurality of pulse width modulation (PWM) signals within the one period based on the control information, each PWM signal corresponding to a respective one of the LED channels and having a pulse with a fixed amplitude and a variable width;

a CPWAM generator to determine a reference voltage and the pulse width of the CPWAM signal based on the PWM signals, and to generate an on-duty signal based on the pulse width of the CPWAM signal, the reference voltage defining the amplitude of the CPWAM signal; and a switch to supply the reference voltage to the at least one LED channel for a duration based on the on-duty signal.

9. The backlight unit of claim 8, wherein the control information includes a global dimming value, a local dimming value, a fixed current value, and a vertical sync signal defining the predetermined length of the one period.

10. The backlight unit of claim 8, wherein the one period of the predetermined length is one frame period of the liquid crystal display device.

11. The backlight unit of claim 8, wherein the at least one LED channel includes a plurality of LEDs connected in series.

12. The backlight unit of claim 8, wherein the LED driver further includes:

a constant current driver to hold a current supplied to the at least one LED channel substantially constant during the one period based on the CPWAM signal.

13. The backlight unit of claim 12, wherein the CPWAM generator is configured to determine the PWM signal with the largest pulse width among the PWM signals, to determine the reference voltage based on the largest pulse width, the reference voltage defining the amplitude of the CPWAM signal, and to determine the pulse width of the CPWAM signal based on the reference voltage and the pulse width of one of the PWM signals corresponding to the at least one LED channel, and to generate the on-duty signal based on the pulse width of the CPWAM signal; and the switch is configured to supply the reference voltage to the constant current driver for the duration based on the on-duty signal.

14. The backlight unit of claim 12, wherein the constant current driver includes:

an amplifier, a driving transistor, and a detection resistor, the amplifier having an inverting terminal coupled to an emitter of the driving transistor, a non-inverting terminal coupled to the CPWAM generator through the switch to receive the reference voltage from the CPWAM generator, and an output coupled to a base of the first driving transistor, the driving transistor having a collector coupled to the at least one LED channel; and the detection resistor having one end coupled to the emitter of the driving transistor and the other end coupled to a ground voltage.

15. In a liquid crystal display device comprising a liquid crystal display panel comprising a plurality of pixels and a backlight unit, the backlight unit including a light source having a plurality of LED channels to provide light to the liquid crystal panel and an LED driver to control the light source based on luminance control information from an external source, a method of driving the light source comprising:

generating in the LED driver a conditional pulse width and amplitude modulation (CPWAM) signal based on the luminance control information, wherein the CPWAM signal has a pulse with an amplitude and width that are both variable from one period of a predetermined length to another period of the predetermined length; and supplying the CPWAM signal to at least one of the LED channels to provide light to the liquid crystal panel, wherein the generating of the CPWAM signal includes:

generating a plurality of pulse width modulation (PWM) signals within the one period based on the luminance control information, each PWM signal corresponding to a respective one of the LED channels and having a pulse with a fixed amplitude and a variable width;

determining the PWM signal with the largest pulse width among the PWM signals; and determining a reference voltage based on the largest pulse width and the fixed amplitude, the reference voltage defining the amplitude of the CPWAM signal.

16. The method of claim 15, wherein the control information includes a global dimming value, a local dimming value, a fixed current value, and a vertical sync signal defining the predetermined length of the one period.

17. The method of claim 15, wherein the one period of the predetermined length is one frame period of the liquid crystal display device.

18. The method of claim 15, wherein the generating of the CPWAM signal further includes:
    determining a pulse width of the CPWAM signal based on the reference voltage and the pulse width of one of the PWM signals corresponding to the at least one LED channel, and to generate an on-duty signal based on the pulse width of the CPWAM signal.

19. The method of claim 18, wherein the supplying of the CPWAM signal includes:
    supplying the reference voltage to the at least one LED channel for a duration based on the on-duty signal.

20. The method of claim 18, wherein the determining of the pulse width of the CPWAM signal includes determining the pulse width based on an equation:

$$Y''' = \frac{X \times Y' \times \frac{J}{2^a}}{X'},$$

wherein $Y'''$ is the pulse width of the CPWAM signal, $X$ is the fixed amplitude of the PWM signals, $Y'$ is a pulse width of the PWM signal corresponding to the at least one LED channel, and $J/2^a$ is the local dimming value for the at least one LED channel, and wherein "a" is a number of dimming data bits, and "J" is a value between 0 and $2^a$.

* * * * *